(12) United States Patent
Baser

(10) Patent No.: US 10,328,406 B2
(45) Date of Patent: Jun. 25, 2019

(54) SYSTEM FOR CONTINUOUS FEEDING AND DISCHARGING OF SOLID MATERIAL TO AND FROM A VESSEL OPERATING UNDER HIGH PRESSURE

(71) Applicant: Swapneshu Baser, Pune (IN)

(72) Inventor: Swapneshu Baser, Pune (IN)

( * ) Notice: Subject to any disclaimer, the term of this patent is extended or adjusted under 35 U.S.C. 154(b) by 192 days.

(21) Appl. No.: 15/542,083

(22) PCT Filed: Feb. 23, 2015

(86) PCT No.: PCT/IN2015/050010
§ 371 (c)(1),
(2) Date: Jul. 7, 2017

(87) PCT Pub. No.: WO2016/110868
PCT Pub. Date: Jul. 14, 2016

(65) Prior Publication Data
US 2018/0272301 A1    Sep. 27, 2018

(30) Foreign Application Priority Data
Jan. 9, 2015    (IN) .............................. 86/MUM/2015

(51) Int. Cl.
*B01J 3/02* (2006.01)
*B01D 11/02* (2006.01)
(Continued)

(52) U.S. Cl.
CPC .............. *B01J 3/02* (2013.01); *B01D 11/0203* (2013.01); *B01D 11/0223* (2013.01);
(Continued)

(58) Field of Classification Search
CPC ..... B01J 3/02; B01J 3/008; B01J 8/002; B01J 2208/00752; B01J 2208/00761; B01D 11/0203; B01D 11/0223; Y02P 20/544
See application file for complete search history.

(56) References Cited

U.S. PATENT DOCUMENTS 2,440,482 A * 4/1948 Martin .................... B01J 8/002
208/161
4,166,731 A * 9/1979 Staege ...................... B01J 3/02
414/217
(Continued)

*Primary Examiner* — Cephia D Toomer

(57) ABSTRACT

A continuous feeding and discharging system for solid material under high pressure is provided. The system includes a feeding assembly, a high pressure vessel, and a discharging assembly. The feeding assembly includes a raw material hopper that feeds solid raw material, a $CO_2$ feeder that feeds dry ice, and a mixer that mixes the solid raw material with the dry ice to form an impermeable mixture. The high pressure vessel performs an extraction process under a supercritical condition to extract soluble components from the solid raw material. The discharging assembly includes a discharging extruder that receives the solid residue discharged from the high pressure vessel, a binder liquid feeder that feeds binder liquid to mix with the solid residue to form a uniform mixture and compacts the mixture to form impermeable pellets of residue, and a discharging valve that discharges the impermeable pellets of residue from the discharging extruder.

16 Claims, 5 Drawing Sheets

(51) Int. Cl.
*B01J 3/00* (2006.01)
*B01J 8/00* (2006.01)
(52) U.S. Cl.
CPC ............... *B01J 3/008* (2013.01); *B01J 8/002* (2013.01); *B01J 2208/00752* (2013.01); *B01J 2208/00761* (2013.01); *Y02P 20/544* (2015.11)

(56) References Cited

U.S. PATENT DOCUMENTS

| | | | | |
|---|---|---|---|---|
| 4,675,133 A | * | 6/1987 | Eggers | B01D 11/0203 554/11 |
| 2011/0272636 A1 | * | 11/2011 | Rubin | B65G 53/30 252/373 |
| 2012/0125324 A1 | * | 5/2012 | Fisk | C08H 8/00 127/1 |

* cited by examiner

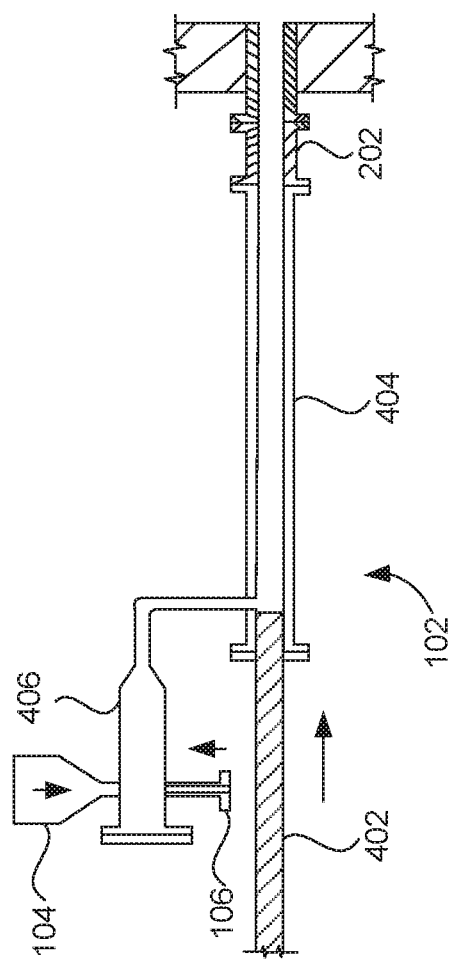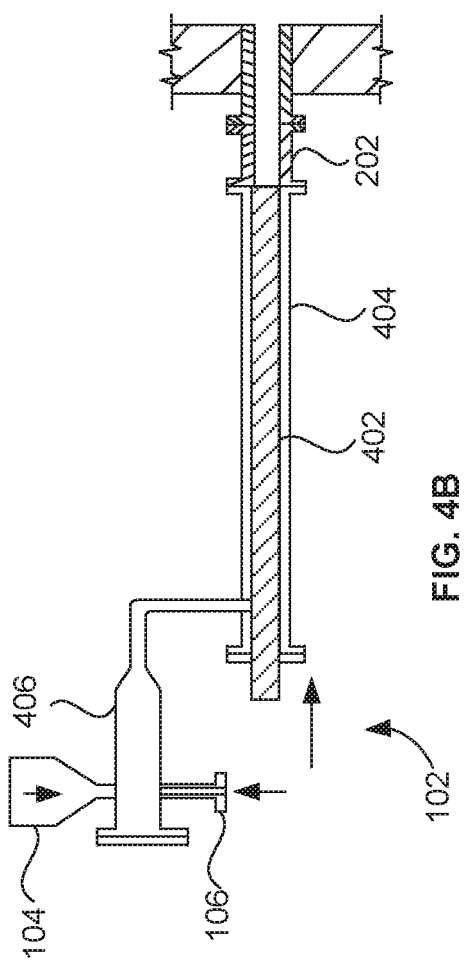

SYSTEM FOR CONTINUOUS FEEDING AND DISCHARGING OF SOLID MATERIAL TO AND FROM A VESSEL OPERATING UNDER HIGH PRESSURE

CROSS-REFERENCE TO PRIOR FILED PATENT APPLICATIONS

This application claims priority from PCT Patent Application number PCT/IN2015/050010 filed on Feb. 23, 2015 the complete disclosure of which, in its entirely, is herein incorporated by reference

BACKGROUND

Technical Field

The embodiments herein generally relate to a feeding and discharging system, and more particularly, to a continuous feeding and discharging system that feeds and discharges solid material continuously to and from the vessel operating under high pressure.

Description of the Related Art

In the supercritical fluid extraction (SCFE) process, the extraction is carried out by a solvent above its critical pressure and temperature. Supercritical Fluid Extraction (SCFE) process typically involves extraction by Supercritical Carbon Dioxide ($CO_2$) as a solvent, under high pressure conditions (typically 100 to 600 Bar pressure). SCFE is a typically operated as a batch, or semi-batch process, and at the end of each extraction batch, the solid raw material being extracted needs to be replaced with fresh solid feed material (i.e. solid raw material powder). Thus, the extractor which is holding the solid feed material needs to be de-pressurized to an atmospheric pressure to allow safe opening of the extractor lid, for replacement of the exhausted solid feed material. After replacement with fresh solid feed material, the extractor again needs to be closed, and re-pressurized to the extraction pressure for re-starting the extraction process, for the new batch. These batch operations involve above stated nonproductive time at the end of each extraction cycle for carrying out (i) de-pressurization, (ii) solid feed material replacement, and (iii) re-pressurization. Further, the efficiency of extraction process progressively reduces when operated in batch mode, as the stationary packed bed of solid raw material keeps getting depleted of extractable components along the length of the bed and in the direction of flow of supercritical $CO_2$ solvent. Thus, the contact length/time between the solvent and the solute keeps decreasing causing reduction in the efficiency/rate of extraction.

The prior art employs a system for extracting caffeine from green coffee beans with a supercritical fluid. A portion of decaffeinated beans is periodically discharged while a portion of fresh beans are essentially simultaneously charged to the extraction vessel, as disclosed in U.S. Pat. No. 4,820,537 to Saul. However, such a system is inefficient because the periodic charging and discharging of the coffee is accomplished through the use of intermediate pressure vessels known as blow cases. Blow cases are merely smaller pressure vessels of about the same volume as the portions of coffee that are periodically charged and discharged, and which are isolated on both ends by valves.

U.S. Pat. No. 4,488,838 discloses a method and apparatus for continuously feeding a crushed or pulverized solid supply material such as coal or the like, from a supply source under ambient pressure into a reactor or the like which is under significantly higher pressure. A liquefied gas such as carbon dioxide or the like, is fed under pressure into the moving supply of such solid materials (as may be contained in a closed casing screw conveyor/extruder or the like) in order to form a slurry which is suitable to be pumped into the receiver against its superior pressure.

U.S. Pat. No. 8,597,386 B2 discloses a method and apparatus for continuously feeding a crushed or pulverized solid supply material such as coal mixed with Dry Ice, and ultimately fed in the form of slurry of solid feed and liquefied $CO_2$, using a progressing cavity pump. The maximum possible discharge pressure of Progressing Cavity pump becomes limitation for its application. This discharge pressure limitation is major limitation in use of similar system for high pressure process like Supercritical Fluid Extraction. Also, above apparatus fails to disclose the discharge of residue from the reactor, without de-pressurizing the reactor.

Accordingly, there remains a need for a continuous feeding and discharging system that feeds solid material and discharges residue continuously to and from a pressure vessel operating under high pressure, without de-pressurizing the pressure vessel.

SUMMARY

In view of a foregoing, an embodiment herein provides a continuous feeding and discharging system. The continuous feeding and discharging system includes a feeding assembly, a high pressure vessel, and a discharging assembly. The feeding assembly includes a raw material hopper, a $CO_2$ feeder, and a mixer. The raw material hopper feeds solid raw material. The $CO_2$ feeder feeds dry ice, or liquid $CO_2$. The mixer mixes the solid raw material with the dry ice to form an impermeable mixture. The high pressure vessel performs an extraction process under a supercritical condition. The feeding assembly pushes the impermeable mixture to the high pressure vessel as pellets of the solid raw material for extraction of soluble components from the solid raw material. The discharging assembly includes a discharging extruder, a binder liquid feeder, and a discharging valve. The discharging extruder receives solid residue discharged from the high pressure vessel. The binder liquid feeder feeds binder liquid to mix with the solid residue to form a uniform mixture. The discharging extruder compacts the uniform mixture to form impermeable pellets of residue. The discharging valve discharges the impermeable pellets of residue from the discharging extruder.

In one embodiment, the solid raw material that is fed to the raw material hopper is pre-mixed with the dry ice, or liquid $CO_2$.

In another embodiment, the feeding assembly further includes a first isolation valve. The feeding assembly feeds the impermeable mixture to the high pressure vessel through the first isolation valve.

In yet another embodiment, the discharging assembly further includes a second isolation valve. The high pressure vessel discharges the solid residue to the discharging extruder through the second isolation valve without loss in the pressure.

In yet another embodiment, the feeding assembly includes a screw that is rotated to mix the solid raw material with the dry ice to form a mixture, and further compacts the mixture to form an impermeable mixture. The rotation of the screw in the feeding assembly further pushes the impermeable mixture to the high pressure vessel without need for de-pressurizing the high pressure vessel to an atmospheric pressure.

In yet another embodiment, the $CO_2$ feeder is fitted to the raw material hopper to provide better distribution of the dry ice with the solid raw material.

In one aspect, a continuous feeding and discharging system is provided. The continuous feeding and discharging system includes a feeding assembly, a high pressure vessel, and a discharging assembly. The feeding assembly includes a raw material hopper, a $CO_2$ feeder, and a screw. The raw material hopper feeds solid raw material. The $CO_2$ feeder feeds dry ice, or liquid $CO_2$. The screw is rotated to mix the solid raw material with the dry ice to form an impermeable mixture. The screw is rotated to completely fill an empty space located in a front section of the feeding assembly with the impermeable mixture. The screw is pushed forward to push the impermeable mixture into the high pressure vessel. The high pressure vessel performs an extraction process under a supercritical condition. The high pressure vessel includes supercritical carbon dioxide ($SCCO_2$) as solvent. The screw pushes the impermeable mixture to the high pressure vessel as pellets of the solid raw material for extraction of soluble components from the solid raw material. The discharging assembly that includes a discharging extruder, a binder liquid feeder, and a discharging valve. The discharging extruder receives solid residue discharged from the high pressure vessel. The binder liquid feeder feeds binder liquid to mix with the solid residue to form a uniform mixture. The discharging extruder further compacts the uniform mixture to form impermeable pellets of residue. The discharging valve discharges the impermeable pellets of residue from the discharging extruder.

In one embodiment, the feeding assembly further includes a first isolation valve. The feeding assembly pushes the screw forward to feed the impermeable mixture to the high pressure vessel through the first isolation valve.

In another embodiment, the first isolation valve is kept closed when the feeding assembly is being filled with the mixture of the solid raw material and the dry ice.

In yet another embodiment, when (a) the feeding assembly is filled with the mixture of the solid raw material and dry ice, and (b) the first isolation valve is in open position, the screw is pushed forward to push the impermeable mixture into the high pressure vessel.

In yet another embodiment, the discharging assembly further includes a second isolation valve. The high pressure vessel discharges the solid residue to the discharging extruder through the second isolation valve without loss in the pressure.

In yet another embodiment, the feeding assembly pushes the impermeable mixture to the high pressure vessel without need for de-pressurizing the high pressure vessel to an atmospheric pressure.

In another aspect, a continuous feeding and discharging system is provided. The continuous feeding and discharging system includes a feeding assembly, a high pressure vessel, and a discharging assembly. The feeding assembly includes (a) a raw material hopper, (b) a $CO_2$ feeder, and (c) a piston-cylinder. The raw material hopper feeds solid raw material. The $CO_2$ feeder feeds dry ice, or liquid $CO_2$. The piston-cylinder includes a piston and a cylinder. The piston-cylinder assembly is filled with the solid raw material and dry ice, or liquid $CO_2$ using a low pressure supply pump. The piston-cylinder assembly pushes a mixture of the solid raw material and the dry ice, or liquid $CO_2$ into the high pressure vessel for extraction of soluble components from the solid raw material. The high pressure vessel performs an extraction process under a supercritical condition. The high pressure vessel includes supercritical carbon dioxide as solvent. The discharging assembly includes a discharging extruder, a binder liquid feeder, and a discharging valve. The discharging extruder receives solid residue discharged from the high pressure vessel. The binder liquid feeder feeds binder liquid to mix with the solid residue to form a uniform mixture. The discharging extruder compacts the uniform mixture to form impermeable pellets of residue. The discharging valve discharges the impermeable pellets of residue from the discharging extruder.

In one embodiment, the feeding assembly further includes a first isolation valve. The first isolation valve is kept closed when the cylinder is being filled with the mixture of the solid raw material and the dry ice, or liquid $CO_2$.

In another embodiment, when the cylinder is filled with the mixture of the solid raw material and the dry ice, or liquid $CO_2$, the piston is pushed forward slightly to block an opening that feeds the mixture of the solid raw material and the dry ice, or liquid $CO_2$ into the cylinder.

In yet another embodiment, when the first isolation valve is opened, the piston is moved forward to complete the stroke to push the mixture of the solid raw material and the dry ice, or liquid $CO_2$ into the cylinder, against the pressure of supercritical carbon dioxide in the high pressure vessel.

In yet another embodiment, the discharging assembly further includes a second isolation valve. The high pressure vessel discharges solid residue to the discharging extruder through the second isolation valve without losing the pressure.

In yet another aspect, a method of continuously feeding solid raw material and discharging solid residue to and from a high pressure vessel using a continuous feeding and discharging system is provided. The method includes following steps of: (a) feeding, using a raw material hopper, solid raw material to a feeding assembly, (b) feeding, using a $CO_2$ feeder, dry ice, or liquid $CO_2$ to the feeding assembly, (c) mixing, using a mixer, the solid raw material with the dry ice to form an impermeable mixture, (d) feeding, using the feeding assembly, the impermeable mixture to the high pressure vessel through a first isolation valve, (e) extracting, using the high pressure vessel, soluble components from the solid raw material resulting in the formation of solid residue, (f) discharging, through a second isolation valve, the solid residue from the high pressure vessel to a discharge extruder, (g) feeding, using a binding liquid feeder, binding liquid to the solid residue, (h) mixing, the solid residue received from the high pressure vessel with the binding liquid to form a uniform mixture, and (i) discharging, through a discharge valve, the impermeable pellets of residue from a discharging extruder. The discharge extruder may further compact the uniform mixture to help in formation of impermeable pellets of the residue.

In one embodiment, when the liquid $CO_2$ is fed through the $CO_2$ feeder, the liquid $CO_2$ is converted into dry ice on expansion to lower pressure near a nozzle of the $CO_2$ feeder.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIGS. 4A and 4B illustrate exploded views of the feeding assembly of FIG. 1 that includes a piston-cylinder assembly to push a mixture of the solid raw material and the dry ice/liquid $CO_2$ into the high pressure vessel according to an embodiment herein.

DETAILED DESCRIPTION OF PREFERRED EMBODIMENTS

Figure 1:
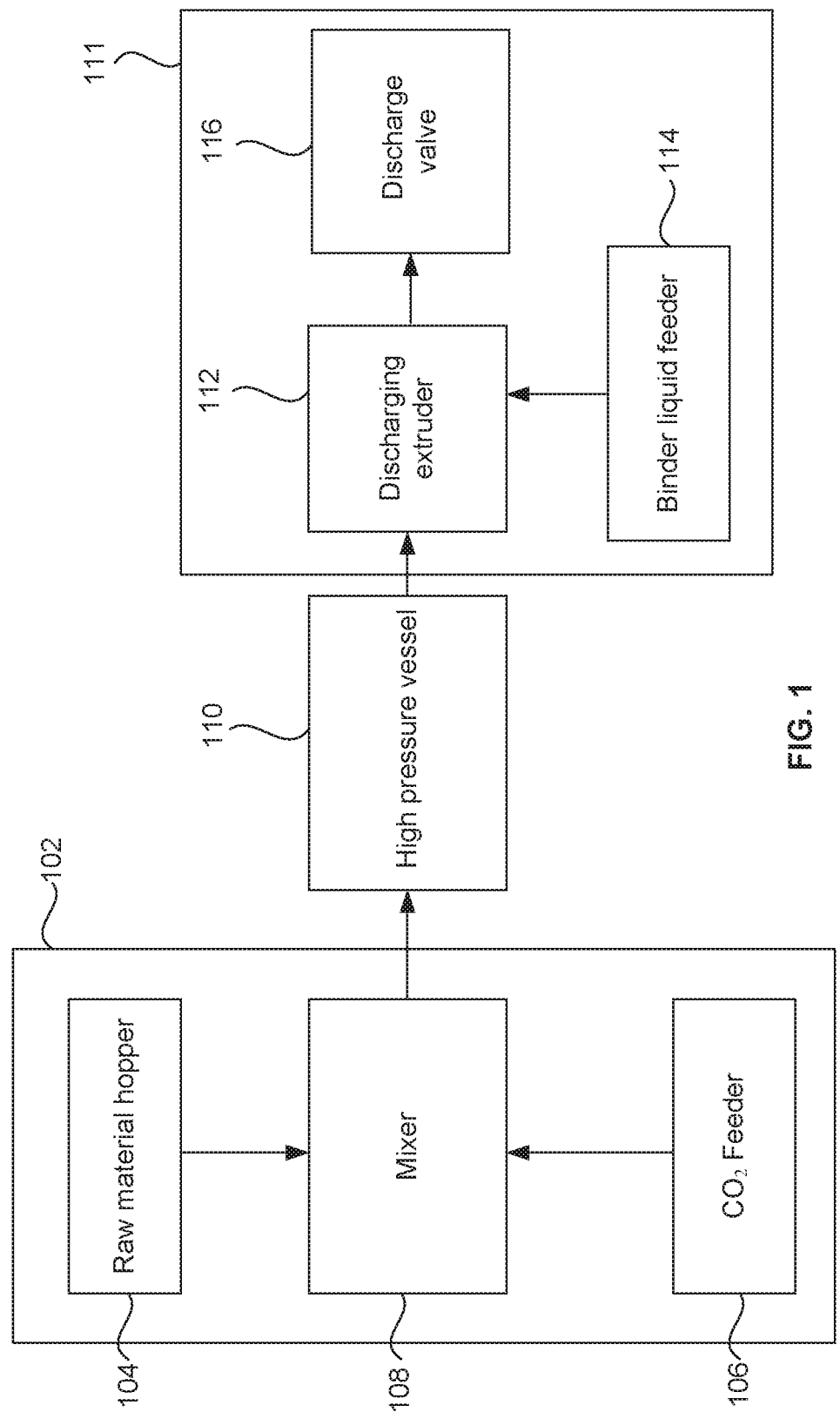
FIG. 1 illustrates a system view of a continuous feeding and discharging system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a continuous feeding and discharging system that feeds solid raw material, and discharges solid residue continuously to and from a pressure vessel operating under high pressure. The embodiments herein achieve this by providing a continuous feeding and discharging system that includes a feeding assembly, a high pressure vessel, and a discharging assembly. The feeding assembly feeds a mixture of solid raw material, and dry ice or liquid $CO_2$ to the high pressure vessel without de-pressurizing the high pressure vessel. The high pressure vessel performs extraction process to extract soluble components from the solid raw material resulting in the formation of solid residue. The discharging assembly discharges the solid residue from the high pressure vessel. Referring now to the drawings, and more particularly to FIG. 1 through FIG. 5, where similar reference characters denote corresponding features consistently throughout the figures, there are shown preferred embodiments.

FIG. 1 illustrates a system view of a continuous feeding and discharging system according to an embodiment herein. The continuous feeding and discharging system includes a feeding assembly 102, a high pressure vessel 110, and a discharging assembly 111. The feeding assembly 102 includes a raw material hopper 104, a $CO_2$ feeder 106, and a mixer 108. In one embodiment, the feeding assembly 102 may include an extruder assembly, or a combination of a piston assembly and the extruder assembly/pump. The discharging assembly 111 includes a discharging extruder or a pelletization system 112, a binder liquid feeder 114, and a discharge valve 116. The raw material hopper 104 feeds solid raw material to the feeding assembly 102. In one embodiment, the solid raw material that is fed to the raw material hopper 104 may be pre-mixed with the dry ice/liquid $CO_2$. The $CO_2$ feeder 106 feeds dry ice (i.e., solid carbon dioxide)/liquid $CO_2$ to the feeding assembly 102. In one embodiment, the $CO_2$ feeder 106 includes a nozzle/opening for feeding the dry ice/liquid $CO_2$ to the feeding assembly 102. In another embodiment, when the liquid $CO_2$ is fed through the $CO_2$ feeder 106, the liquid $CO_2$ is converted into dry ice on expansion near the nozzle of the $CO_2$ feeder 106. In other words, the liquid $CO_2$ that is fed using the $CO_2$ feeder 106 is converted into dry ice on expansion to lower pressures inside an initial section of the feeding assembly 102. The mixer 108 mixes the solid raw material with the dry ice to form an impermeable mixture, which gets converted to pellets of the solid raw material, as the impermeable mixture enters the high pressure vessel 110. The solid raw material is typically porous in nature, and having voids, inside as well as between particles of the solid raw material. These voids in the solid raw material act as leak paths for the high pressure $CO_2$ held inside the high pressure vessel 110. On mixing of the solid raw material with the dry ice (i.e. solid $CO_2$), the dry ice fills the voids, and block said leak paths for high pressure $CO_2$. In one embodiment, the dry ice (i.e. solid $CO_2$) acts as a binder/filler to the solid raw material, and eliminates a need for addition of any other binding/filling material which may cause contamination of extract in the extraction process. In one embodiment, the nozzle of the $CO_2$ feeder 106 may also be fitted to the raw material hopper 104 to provide better distribution of the dry ice within the solid raw material. The feeding assembly 102 may further include a first isolation valve (not shown in FIG. 1). The feeding assembly 102 feeds the impermeable mixture to the high pressure vessel 110 through the first isolation valve. The high pressure vessel 110 (e.g., an extractor, or a supercritical fluid extractor) under a supercritical condition performs the extraction process (e.g., supercritical fluid $CO_2$ extraction [SCFE] process) to extract soluble components from the solid raw material powder resulting in the formation of solid residue (i.e. solid material that remains after extraction process). In one embodiment, the discharging assembly 111 includes a second isolation valve (not shown in FIG. 1). The high pressure vessel 110 discharges the solid residue (i.e. solid material powder that remains after extraction process) to the discharging extruder 112 through the second isolation valve located at the bottom side of the high pressure vessel 110. The binding liquid feeder 114 feeds binding liquid (e.g., gum, resins etc.) to the discharging extruder 112. The discharging extruder 112 mixes the solid residue received from the high pressure vessel 110 with the binding liquid to form a uniform mixture. The discharging extruder 112 further compacts the uniform mixture to form impermeable pellets of the residue. The impermeable pellets of the residue are discharged through the discharge valve 116 located at the end of the discharging extruder 112.

Figure 2:
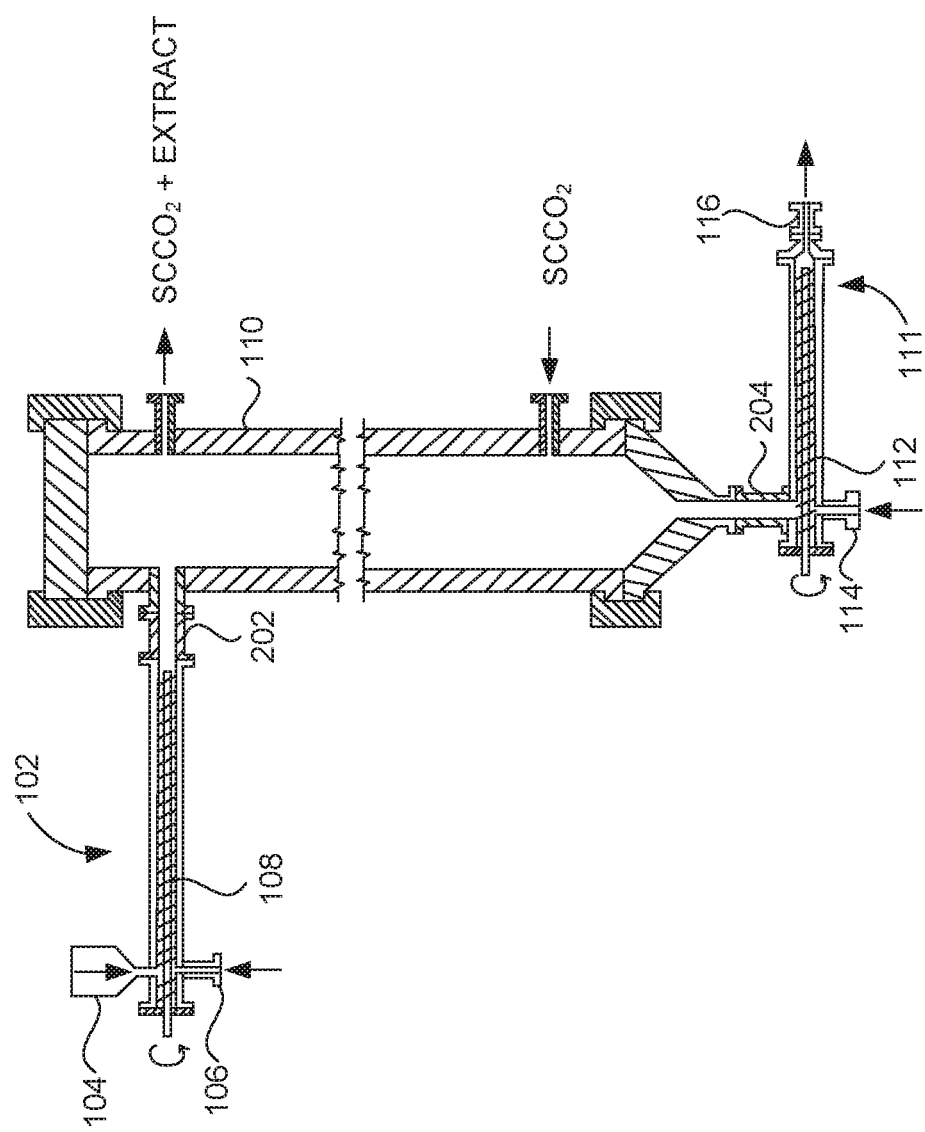
FIG. 2 illustrates an exploded view of the continuous feeding and discharging system of FIG. 1 according to an embodiment herein.
Figure 3A:
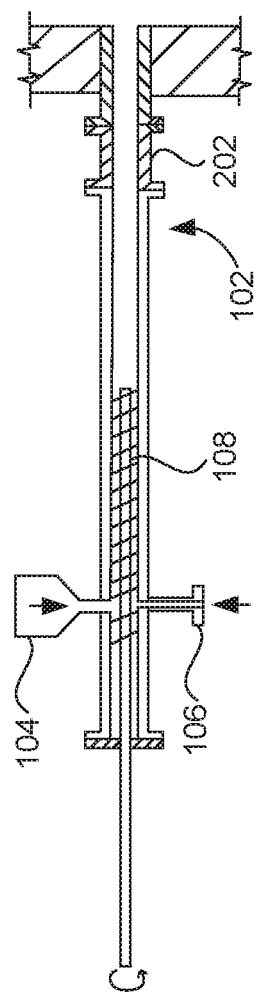
FIGS. 3A and 3B illustrate exploded views of the feeding assembly of FIG. 1 that includes a screw that also acts like a piston to push the impermeable mixture into the high pressure vessel according to an embodiment herein.
Figure 3B:
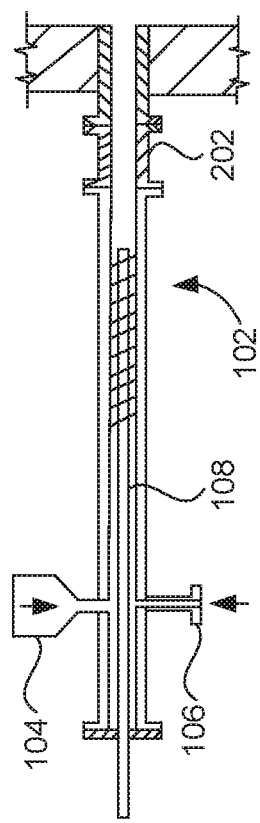

With reference to FIG. 1, FIG. 2 illustrates an exploded view of the continuous feeding and discharging system of FIG. 1, according to an embodiment herein. The continuous feeding and discharging system includes the raw material hopper 104, the $CO_2$ feeder 106, the mixer 108, the high pressure vessel 110, the discharging extruder 112, the binder liquid feeder 114, a discharge valve 116, a first isolation valve 202, and a second isolation valve 204. The raw material hopper 104 feeds solid raw material to the feeding assembly 102. The $CO_2$ feeder 106 feeds dry ice (i.e., solid carbon dioxide), or liquid $CO_2$ to the feeding assembly 102. The mixer 108 mixes the solid raw material with the dry ice to form an impermeable mixture that gets converted to pellets of the solid raw material, as the impermeable mixture enters the high pressure vessel 110. The feeding assembly 102 pushes the impermeable mixture to the high pressure vessel 110 through the first isolation valve 204. In one embodiment, the feeding assembly 102 includes a screw that is rotated to mix the solid raw material with the dry ice to form a mixture, and further compact the mixture to form an impermeable mixture. The rotation of the screw in the feeding assembly 102 pushes the impermeable mixture to the high pressure vessel 110, without need for de-pressurizing the high pressure vessel 110 to an atmospheric pressure. In another embodiment, the feeding assembly 102 pushes the impermeable mixture to form the pellets of the solid raw material, as the impermeable mixture enters the high pressure vessel 110. The high pressure vessel 110 (e.g., an extractor, or a supercritical fluid extractor) under a supercritical condition performs the extraction process (e.g., supercritical fluid ($CO_2$) extraction [SCFE] process) to extract the soluble components from the solid raw material resulting in the formation of solid residue (i.e. solid material that remains after extraction process).

In one embodiment, the high pressure vessel 110 includes supercritical carbon dioxide ($SCCO_2$) that is flowing through the high pressure vessel 110. The high pressure vessel 110 discharges the solid residue (i.e. solid material powder that remains after extraction) using the discharging extruder 112 through the second isolation valve 204, without loss of the pressure of supercritical $CO_2$. In one embodiment, the second isolation valve 204 is located at the bottom side of the high pressure vessel 110. The binding liquid feeder 114 feeds binding liquid (e.g., gum, resins etc.) to the discharging extruder 112. The discharging extruder 112 mixes the solid residue received from the high pressure vessel 110 with the binding liquid to form a uniform mixture. The discharging extruder 112 further compacts the uniform mixture to finally form impermeable pellets of the residue. The impermeable pellets of residue are discharged through the discharge valve 116 at the end of the discharging extruder 112.

In one embodiment, the high pressure vessel 110 is filled with the supercritical carbon dioxide that continuously flows through the high pressure vessel 110. The supercritical carbon dioxide is fed to the high pressure vessel 110 through a nozzle/opening located at lower side of the high pressure vessel 110. The supercritical carbon dioxide is discharged along with the soluble components (extract) through a nozzle/opening located at upper side of the high pressure vessel 110.

In one embodiment, the dry ice in the pellets of the solid raw material is converted to supercritical $CO_2$ inside the high pressure vessel 110 after getting exposed to the higher temperature condition (i.e. above critical temperature of $CO_2$) which is maintained inside the high pressure vessel 110. Thus, the dry ice that is converted into supercritical $CO_2$ inside the high pressure vessel 110 helps in the extraction process, and also reduces load on high pressure $CO_2$ supply pump of the SCFE process. In other words, the dry ice (i.e. solid $CO_2$) which is penetrated inside voids/pores of the solid raw material (during mixing process in the feeding assembly 102) expands suddenly to the supercritical condition, which in turn, also expands the internal structure of the solid raw material, and makes the extractable/soluble components present inside the solid raw material, easily accessible to the supercritical $CO_2$ solvent that is flowing through the high pressure vessel 110. The process of sudden expansion of the solid raw material inside the high pressure vessel 110 increases the efficiency/rate of the extraction process (e.g., the supercritical fluid extraction (SCFE) process), as compared to the conventional batch type SCFE process, where such sudden expansion of the internal structure of raw material is not possible during the normal extraction process.

With reference to FIG. 1 and FIG. 2, FIGS. 3A and 3B illustrate exploded views of the feeding assembly 102 of FIG. 1 that includes a screw that pushes the mixture of the solid raw material and the dry ice (i.e. impermeable mixture) into the high pressure vessel 110 according to an embodiment herein. The exploded views of the feeding assembly 102 include the raw material hopper 104, the $CO_2$ feeder 106, and the mixer 108. The feeding assembly 102 includes a screw that rotates to completely fill an empty space located in the front section of the feeding assembly 102 with the mixture of the solid raw material and the dry ice. The first isolation valve 202 is kept closed while filling the feeding assembly 102 with the mixture of the solid raw material and the dry ice. When (a) the feeding assembly 102 is filled with the mixture of the solid raw material and the dry ice, and (b) the first isolation valve 202 is in open position, the screw is made to act like a piston by laterally pushing it forward to push the mixture of the solid raw material and the dry ice (i.e. impermeable mixture) into the high pressure vessel 110. The feeding assembly 102 pushes the impermeable mixture to the high pressure vessel 110 without need for de-pressurizing the high pressure vessel 110 to an atmospheric pressure. The forward movement of the screw pushes the impermeable mixture to the high pressure vessel 110. Once the impermeable mixture is pushed to the high pressure vessel 110, the first isolation valve 202 is closed, and the screw is pulled back to original position to start rotation of the screw to re-fill the empty space in front of the feeding assembly 102 with the mixture of the solid raw material and the dry ice.

With reference to FIG. 1 and FIG. 2, FIGS. 4A and 4B illustrate exploded views of the feeding assembly 102 of FIG. 1 that includes a piston-cylinder assembly to push a mixture of the solid raw material and the dry ice/liquid $CO_2$ into the high pressure vessel 110 according to an embodiment herein. The piston-cylinder assembly includes a piston 402 and a cylinder 404. The piston-cylinder assembly is fitted with a low pressure feeding assembly (e.g., a supply pump) 406 to push the mixture of the solid raw material and the dry ice/liquid $CO_2$ to the empty piston-cylinder assembly. Before starting a forward piston stroke, the piston-cylinder assembly is filled with the solid raw material and the dry ice/liquid $CO_2$ using the low pressure supply pump 406 (e.g., an extruder, a screw pump, a progressive cavity pump, etc.). The first isolation valve 202 is kept closed while filling the cylinder 404 with a low pressure mixture of the solid raw material, and the dry ice/liquid $CO_2$. When the cylinder 404 is filled with the mixture of the solid raw material, and the dry ice/liquid $CO_2$, the piston 402 is pushed forward slightly to block an opening that feeds the low pressure mixture into the cylinder 404. The first isolation valve 202 is opened, and the piston 402 is moved forward to complete the stroke to push the mixture held inside the cylinder 404, against a supercritical $CO_2$ pressure in the high pressure vessel 110. The first isolation valve 202 needs to be closed again, before pulling back of the piston 402 to starting point to allow filling of the cylinder 404 with the low pressure mixture of the solid raw material and the dry ice/liquid $CO_2$ using the low pressure supply pump 406.

Figure 5:
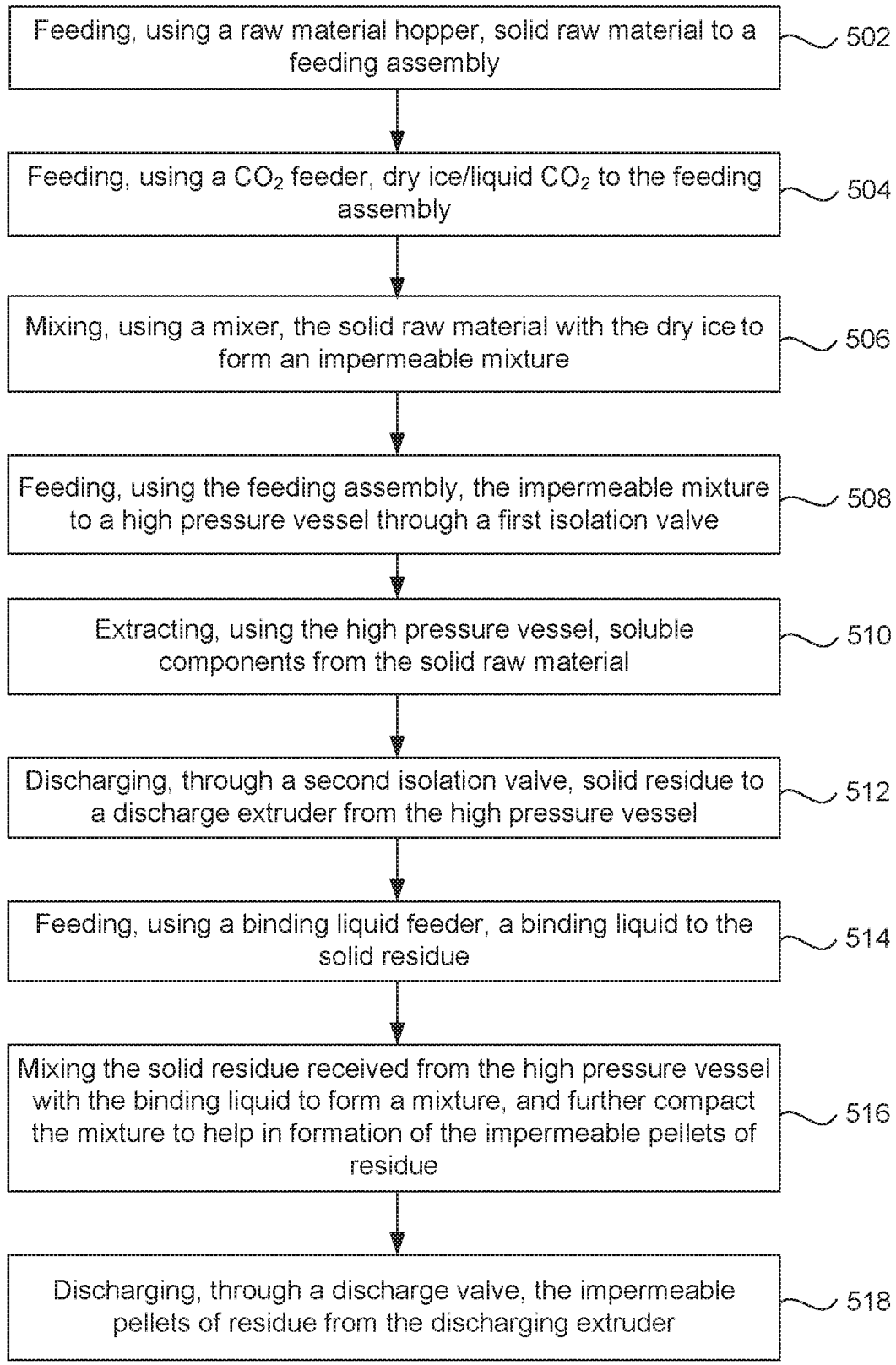
FIG. 5 is a flow diagram illustrates a method of continuous feeding of solid raw material and discharging of solid residue to and from the high pressure vessels using the continuous feeding and discharging system of FIG. 1 according to an embodiment.

FIG. 5 is a flow diagram illustrates a method of continuous feeding of solid raw material and discharging of solid residue to and from the high pressure vessels using the continuous feeding and discharging system of FIG. 1 according to an embodiment. At step 502, the raw material hopper 104 feeds the solid raw material to the feeding assembly 102. In one embodiment, the solid raw material that is fed to the raw material hopper 104 may be pre-mixed with the dry ice/liquid $CO_2$. At step 504, the $CO_2$ feeder 106 feeds dry ice (i.e., solid carbon dioxide) or liquid $CO_2$ to the feeding assembly 102. In one embodiment, the $CO_2$ feeder 106 includes a nozzle/opening for feeding the dry ice/liquid $CO_2$ to the feeding assembly 102. In one embodiment, when the liquid $CO_2$ is fed through the $CO_2$ feeder 106, the liquid $CO_2$ is converted into the dry ice on expansion near the nozzle of the $CO_2$ feeder 106. At step 506, a mixer mixes the solid raw material with the dry ice to form an impermeable mixture that gets converted to pellets of the solid raw material, as the impermeable mixture enters the high pressure vessel 110. At step 508, the feeding assembly 102 feeds the impermeable mixture to the high pressure vessel 110 through the first isolation valve 202. At step 510, the high pressure vessel 110 (e.g., an extractor, or a supercritical fluid extractor) under a supercritical condition performs the extraction process (e.g., supercritical fluid [$CO_2$] extraction (SCFE) process) to extract soluble components from the solid raw material resulting in formation of solid residue (i.e. solid material that remains after extraction process). At step 512, the high pressure vessel 110 discharges the solid residue (i.e. solid material powder that remains after extraction) to the discharging extruder 112 through the second isolation valve 204 located at the bottom side of the high pressure vessel 110. At step 514, the binding liquid feeder 114 feeds binding liquid (e.g., gum, resins etc.) to the solid residue in the discharging extruder 112. At step 516, the discharging extruder 112 mixes the solid residue received from the high pressure vessel 110 with the binding liquid to form a uniform mixture, and further compacts the uniform mixture to help in formation of impermeable pellets of residue. At step 518, the impermeable pellets of residue are discharged through the discharge valve 116 located at the end of the discharging extruder 112.

The continuous feeding and discharging system feeds the mixture of the solid raw material, and the dry ice (i.e. impermeable mixture) to the high pressure vessel 110, without need for de-pressurizing the high pressure vessel 110 to an atmospheric pressure. The dry ice in the impermeable mixture is converted into supercritical $CO_2$ inside the high pressure vessel 110, and helps in the extraction process, thereby reduces load on high pressure $CO_2$ supply pump of the SCFE process. The process of sudden expansion of the solid raw material inside the high pressure vessel 110 increases the efficiency/rate of the extraction process (e.g., the supercritical fluid extraction (SCFE) process), as compared to the conventional batch type SCFE process.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A continuous feeding and discharging system comprises:
   a feeding assembly that comprises:
   a raw material hopper that feeds solid raw material;
   a $CO_2$ feeder that feeds dry ice or liquid $CO_2$;
   a mixer that mixes the solid raw material with the dry ice or liquid $CO_2$; and
   a piston-cylinder assembly comprises a piston and a cylinder, wherein the piston-cylinder assembly receives a mixture of the solid raw material and the dry ice, or liquid CO2 using a low pressure supply pump;
   a high pressure vessel that performs an extraction process under a supercritical condition, wherein the piston-cylinder pushes the mixture of the solid raw material and the dry ice, or liquid CO2 to the high pressure vessel for extraction of soluble components from the solid raw material; and
   a discharging assembly that comprises:
   a discharging extruder that receives solid residue discharged from the high pressure vessel;
   a binder liquid feeder that feeds binder liquid to the discharging extruder, wherein the discharging extruder first mixes the solid residue with the binder liquid to form a uniform mixture, wherein the discharging extruder further compacts the uniform mixture to form impermeable pellets of residue; and
   a discharging valve that discharges the impermeable pellets of residue from the discharging extruder without loss of pressure from the high pressure vessel.

2. The system of claim 1, wherein the raw material hopper feeds the solid raw material that is pre-mixed with the dry ice, or liquid $CO_2$.

3. The system of claim 1, wherein feeding assembly further comprises a first isolation valve, wherein the feeding assembly feeds the mixture of the solid raw material and the dry ice, or liquid CO2 to the high pressure vessel through the first isolation valve.

4. The system of claim 1, wherein the discharging assembly further comprises a second isolation valve through which the high pressure vessel discharges the solid residue to the discharging extruder.

5. The system of claim 1, wherein the feeding assembly comprises one or more screws which rotate to mix the solid raw material with the dry ice to form a mixture, and further compacts the mixture to form an impermeable mixture.

6. The system of claim 1, wherein the $CO_2$ feeder is fitted to the raw material hopper to provide better distribution of the dry ice, or liquid $CO_2$ with the solid raw material.

7. The system of claim 5,
   wherein the one or more screws rotate to push the mixture to completely fill an empty space located in a front section of the feeding assembly, wherein the one or more screws is pushed forward to push the mixture into the high pressure vessel without need for de-pressurizing the high pressure vessel to an atmospheric pressure.

8. The system of claim 5, wherein the one or more screws further rotate to compact the mixture to form an impermeable mixture, and to push the impermeable mixture into the high pressure vessel without need for de-pressurizing the high pressure vessel to an atmospheric pressure.

9. The system of claim 1, wherein the feeding assembly receives the mixture of the solid raw material and the dry ice, or liquid CO2 when the first isolation valve is in closed condition.

10. The system of claim 7, wherein the one or more screws are pushed forward to act as a piston to push the mixture into the high pressure vessel through the first isolation valve after the feeding assembly is filled with the mixture of the solid raw material and dry ice.

11. The system of claim 1, wherein the piston is pushed forward enough to block an opening through which the mixture of the solid raw material and the dry ice or liquid CO2 is fed into the cylinder, when the cylinder is completely filled with the mixture.

12. The system of claim 1, wherein the piston moves forward to complete the stroke to push the mixture of the solid raw material and the dry ice, or liquid $CO_2$ through the first isolation valve into the high pressure vessel against the pressure of supercritical carbon dioxide in the high pressure vessel.

13. A method of continuously feeding solid raw material to a high pressure vessel and discharging solid residue from the high pressure vessel using a continuous feeding and discharging system, said method comprising:

feeding, using a raw material hopper, the solid raw material to a feeding assembly;

feeding, using a $CO_2$ feeder, dry ice, or liquid $CO_2$ to the feeding assembly;

mixing, using a mixer, the solid raw material with the dry ice to form an impermeable mixture;

feeding, using the feeding assembly, the impermeable mixture to the high pressure vessel through a first isolation valve;

extracting, using the high pressure vessel, soluble components from the solid raw material;

discharging, through a second isolation valve, the solid residue from the high pressure vessel to a discharge extruder;

feeding, using a binding liquid feeder, binding liquid to the solid residue;

mixing, the solid residue received from the high pressure vessel with the binding liquid to form a mixture, wherein discharge extruder further compacts the mixture to help in formation of impermeable pellets of the residue; and discharging, through a discharge valve, the impermeable pellets of residue from the discharging extruder.

14. The method of claim 13, wherein when the liquid $CO_2$ is fed through the $CO_2$ feeder, the liquid $CO_2$ is converted into dry ice on expansion to lower pressure near a nozzle of the $CO_2$ feeder.

15. The method of claim 13, wherein the first isolation valve is in closed condition when the feeding assembly is being filled with the mixture of the solid raw material and the dry ice, or liquid CO2.

16. The method of claim 13, wherein the solid raw material that is fed to the raw material hopper is pre-mixed with the dry ice, or liquid CO2.

* * * * *